Feb. 16, 1943.  K. W. COUSE  2,311,030
POWER TAKE-OFF
Filed Feb. 13, 1942  4 Sheets-Sheet 1
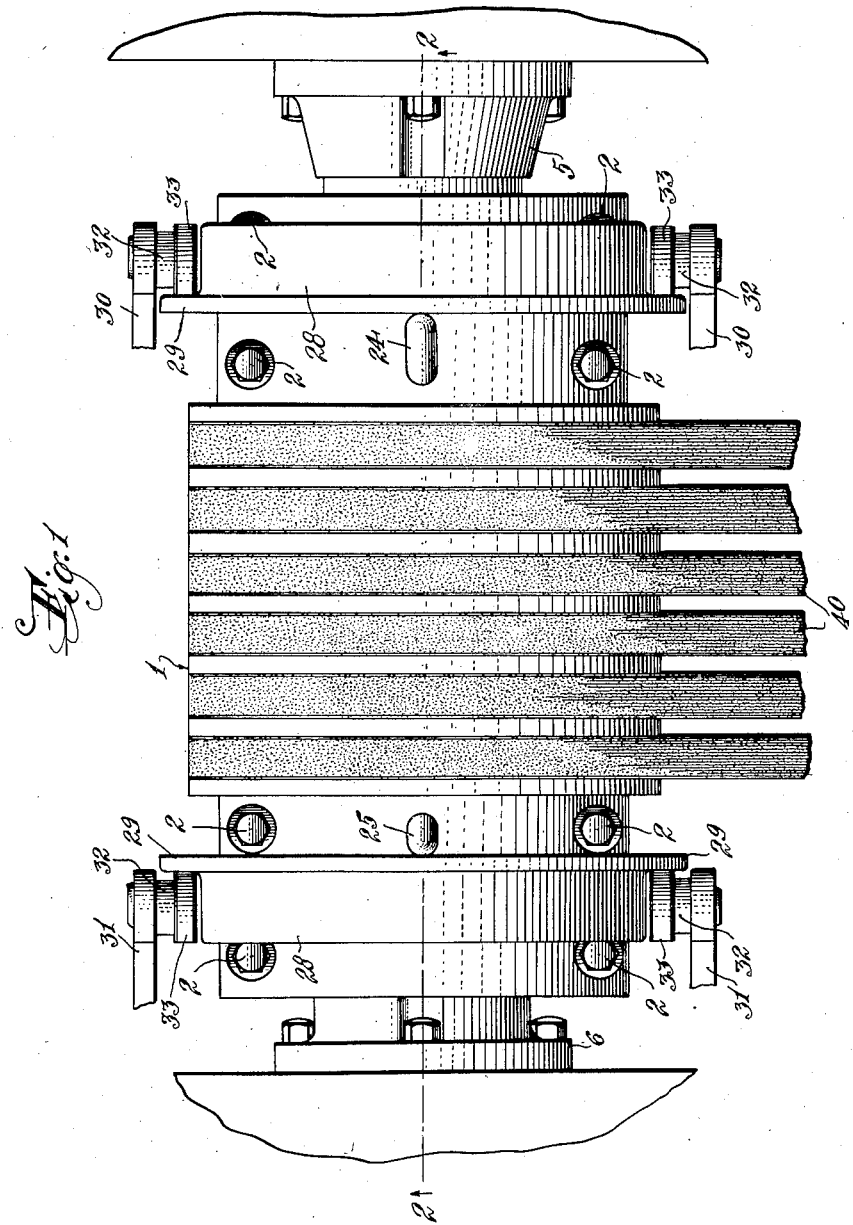
INVENTOR
Kibbey W. Couse
BY
A. D. T. Libby
ATTORNEY Feb. 16, 1943.   K. W. COUSE   2,311,030
POWER TAKE-OFF
Filed Feb. 13, 1942   4 Sheets-Sheet 2
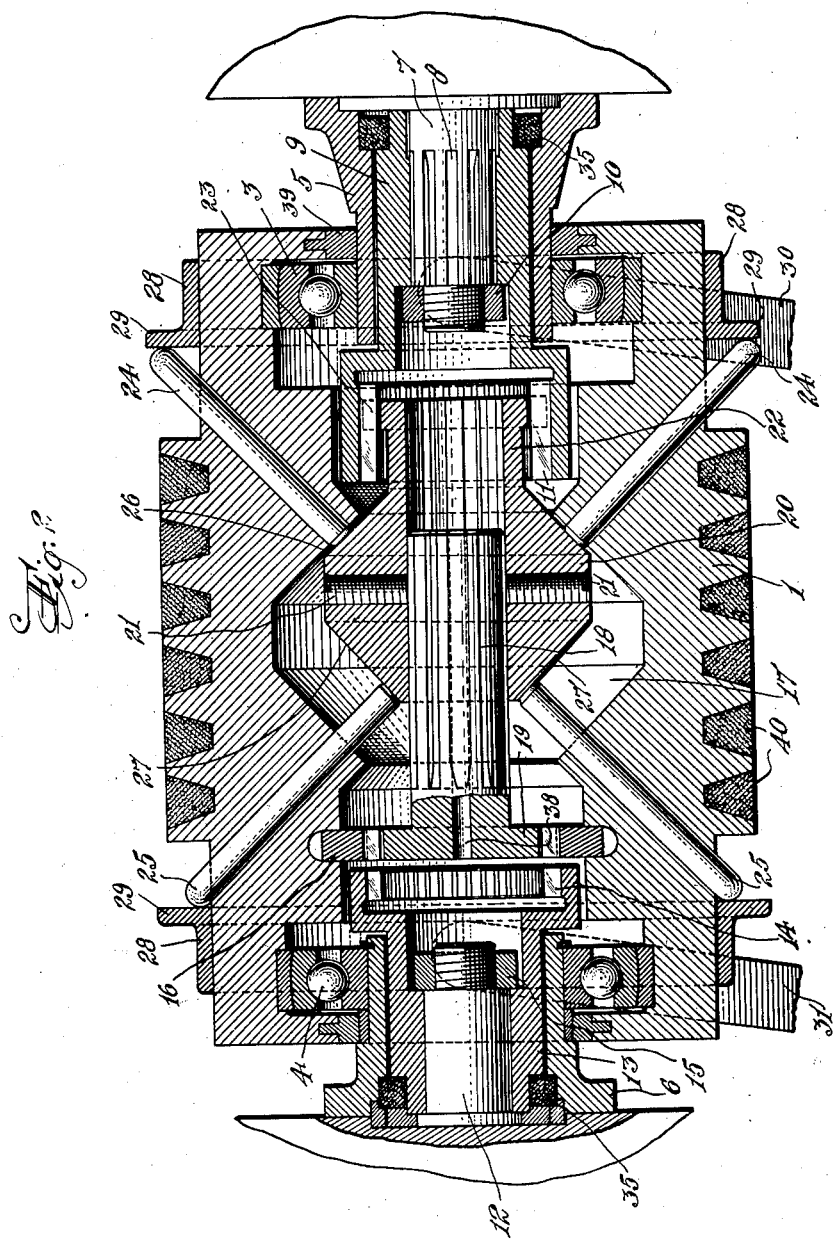

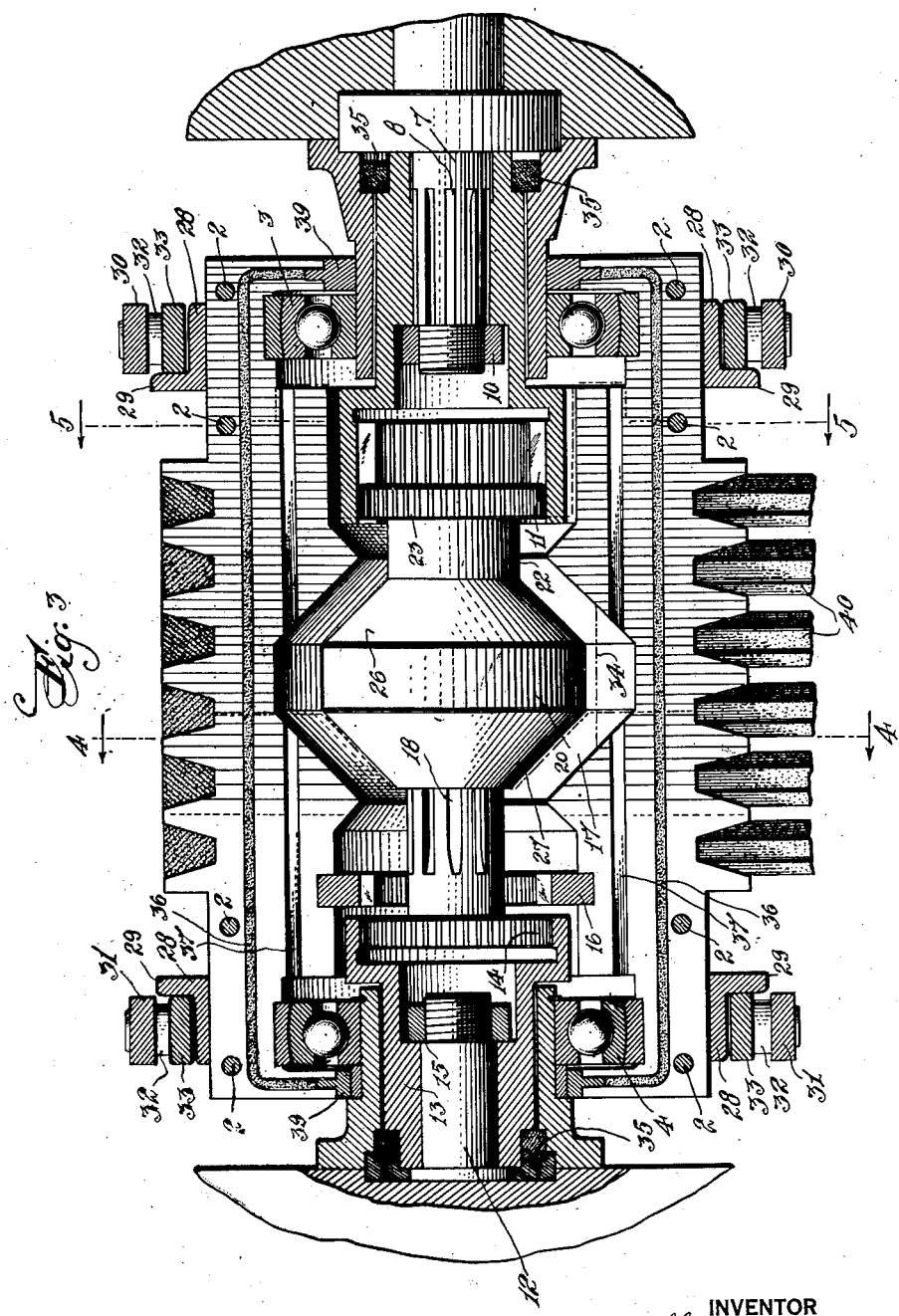

Feb. 16, 1943. K. W. COUSE 2,311,030
POWER TAKE-OFF
Filed Feb. 13, 1942 4 Sheets—Sheet 4
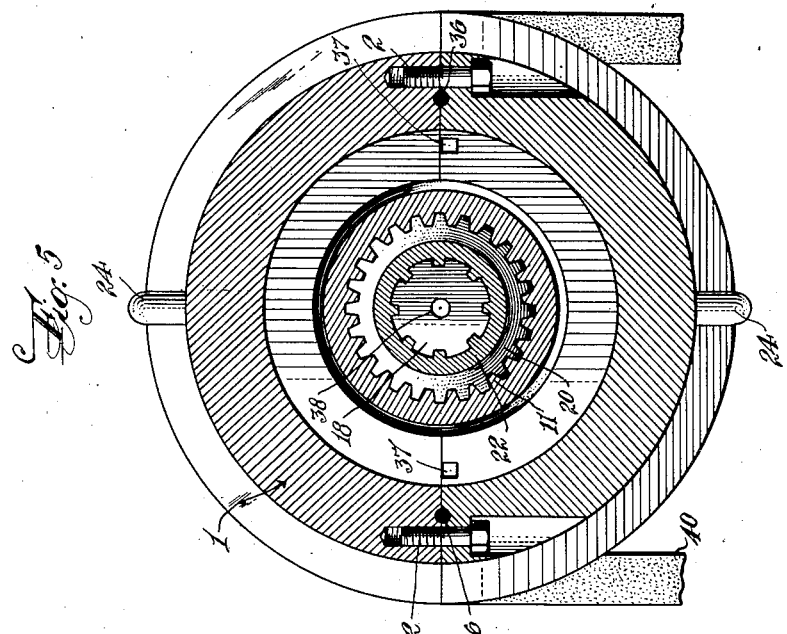
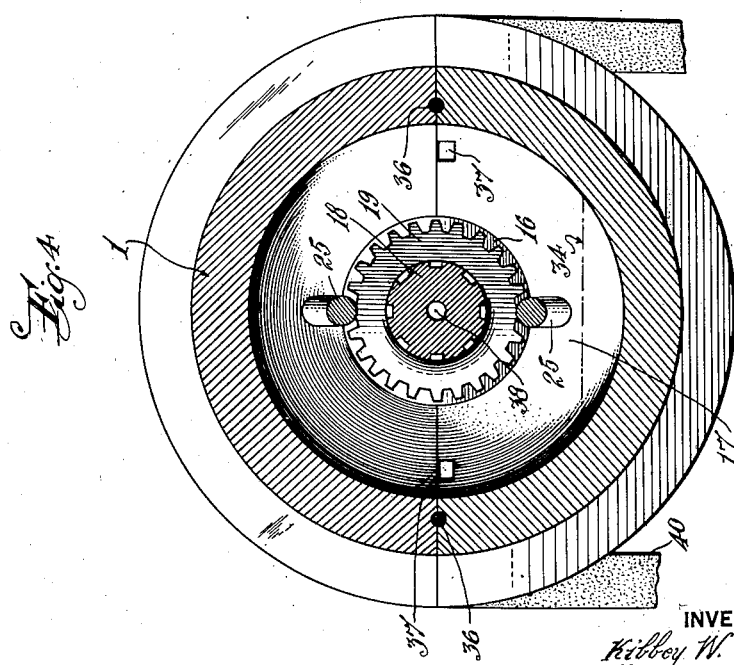
INVENTOR
Kibbey W. Couse
BY
A. D. T. Libby
ATTORNEY Patented Feb. 16, 1943

2,311,030

UNITED STATES PATENT OFFICE 2,311,030

POWER TAKE-OFF

Kibbey Whitman Couse, Newark, N. J.

Application February 13, 1942, Serial No. 430,760

10 Claims. (Cl. 74—11)

This invention relates to a power take-off especially adapted for use in connection with a traveling machine shop such as shown in my Design Patent D-109,942, issued May 31, 1938, which is designed especially for use by an army. This type of army truck carries various pieces of machine shop tools such as a lathe, milling machine, drill press, shaper, grinder, welding machine, air compressor and other apparatus which is found necessary in making repairs in the field on aeroplanes, trucks, tanks, automobiles and other war equipment.

In order to operate the machines requiring a rotary drive from the engine which propells the vehicle, or from a separate engine carried by the vehicle, I tried many devices but found no satisfactory power take-off on the market. I have, therefore, after much study and experimentation, evolved the structure to be described herein and shown in the annexed drawings.

In view of what has just been said, it will appear that the principal object of invention is to provide a satisfactory power take-off which can be used to transfer the power derived from the vehicle engine or, for that matter, any other source of power, to various machine tools.

Another ancillary object of my invention is to provide a power take-off so constructed that it cannot be used to operate the machines while the truck is being transported under its own power.

Another object is to provide a power take-off which has low friction losses and which may be easily controlled to obtain the necessary driving connections between the prime mover and the parts which are to be operated.

Other objects will appear from the description which follows. In the drawings,

Figure 1 is a plan view of the completely assembled take-off structure.

Figure 2 is a longitudinal, sectional view on the line 2—2 of Figure 1, some of the parts, however, being shown in elevation.

Figure 3 is a sectional view similar to Figure 2 but taken at right angles thereto.

Figure 4 is a section on the line 4—4 of Figure 3.

Figure 5 is a section on the line 5—5 of Figure 3.

In the various views, where like numbers refer to corresponding parts, 1 is a generally cylindrically formed hollow casing made up of a plurality of parts, preferably two in number as more particularly shown in Figure 5, these parts being held together by screw studs 2. The casing 1 is supported at opposite ends by anti-friction bearings 3 and 4. The bearing 3 is carried on a support member 5 which projects inwardly into the casing 1. The bearing 4 is carried by a support member 6 projecting into the opposite end of the casing 1.

A driving shaft 7 has splines 8 which drivingly engage a driving member 9 which is held in longitudinal movement on the member 7 by any satisfactory means as by a lock nut 10. The inner end of the driving member 9 is enlarged and has gear teeth 11 formed or cut on the interior part of this enlarged portion.

A driven shaft 12 carries a driven member 13, the inner end of which—the same as the inner end of the driving member 9—projects within the casing 1 and terminates in an enlarged portion having internal gear teeth 14. The driven member 13 is held to the driven shaft 12 in any satisfactory manner as by a lock nut 15.

Positioned toward one end of the casing 1 and securely anchored thereto on the inner periphery is a gear 16. Located within the hollow portion 17 of the casing 1 is a transmission means which includes a splined shaft 18 having a gear-wheel 19 fastened thereto at one end closely adjacent the gear teeth 14 on the driven member 13. As shown in Figure 2, the gear 19 is in mesh with the gear 16 so that as the shaft 18 is turned in a manner to be presently described, the casing 1 will be likewise rotated.

Carried on the splined shaft 18 is a member 20. That part which is in engagement with the shaft 18 is formed, as shown in Figures 2 and 3, somewhat like a double truncated cone in which the bases are together, and through this base portion one or more set screws 21 are positioned for anchoring the member 20 in a proper adjustable relation longitudinally of the shaft 18. The member 20 has a tubular extension 22 which terminates in a gear 23, and it will be seen from Figures 2 and 3 that the gear 23 is continually in mesh with the gear teeth 11 on the member 9 for all longitudinal movements of the transmission means which, as just explained, is made up of the shaft and the member 20, including the gears 19 and 23.

The casing 1 carries, near one end, a pair of pins 24 and at the opposite end a similar pair of pins 25. These pins, as shown in Figure 2, are carried by the casing at an acute angle with respect to the rotary axis of the structure and extend inwardly into close proximity with their respective conical surfaces 26 and 27 on the member 20. As will be seen from Figure 5, the pairs of pins 24 and 25 are arcuately positioned in the casing and spaced 180 degrees from each other.

On the opposite ends of the casing 1 are slidably located rings 28 having flanges 29, the flanges being in contact with or in close proximity to the outer ends of their respective pins. Lever arms 30 and 31, which may be of the forked type, carry studs 32 on which are positioned rollers 33 that are adapted to engage the flange on the ring 28 for a purpose which will be presently described.

The hollow portion of the casing 1 is preferably filled with oil to a level as indicated by the broken line 34 so that as the transmission means is rotated within the casing, the oil is thrown to all portions of the parts within the casing, gaskets 35 being used at the outer extremities of the driving and driven members 9 and 13. Likewise, gaskets 36 are used between the parts of the casing. Oil passages 37 in the casing 1, as well as a central hole 38 through the shaft 15, assist in conveying oil to the various parts of the structure, oil-and-dirt seals 39 being used adjacent the bearings 3 and 4.

The outer surface of the casing 1 has a central portion which may be grooved to receive a plurality of V-shaped belts 40 which go to a power supply shaft for the various machines. While I have shown a plurality of V-type belts, a single flat belt may be used on the driving surface of the casing.

Coming now to the operation of the structure, the power input end or the driving shaft 7 preferably comes from the truck transmission which is connected in the usual way to the main operating engine of the vehicle, while the output end of the structure or the driven shaft 12 becomes the propeller shaft of the vehicle going to the differential. When the transmission means of the power take-off structure is in the position shown in Figure 2, throwing the gearshift lever of the truck transmission into any one of its positions, the gear 19 being in engagement with the gear 16 of the casing 1, the casing 1 is rotated to deliver power to the machines carried by the truck, and the speed of rotation of the casing 1 may be governed by the truck transmission.

When it is desired to move the vehicle, the truck transmission must be thrown to neutral position and then the lever 30 operated so as to cause the pins 24, acting against the conical surface 26, to push the transmission means of the take-off to the left, thereby causing the gear 19 to mesh with the gear teeth 14 on the driven member 13. The vehicle is then in condition to be moved, but the power take-off is disconnected since the gear 19 is moved out of mesh with the gear 16.

After the vehicle has been running and is bright to a stop and it is desired to use the machines of the truck, then the truck transmission is brought to neutral and the lever 31 is operated to cause the ring 28 to operate on its pins 25 to push the transmission means of the take-off to the right so the gear 19 will engage the gear 16. Then, by throwing in the truck transmission, power is delivered to the take-off structure.

While I have described this power take-off structure as especially adapted for use with an army truck, it is evident that it may be used in other arrangements so that I do not wish to be unduly limited in the interpretation of the appended claims.

What I claim is:

1. A power take-off including an outer generally cylindrically formed hollow casing having an outer portion adapted to receive means for transmitting power from the casing, support means including bearings for each end of the casing, a driving member entering the casing through the support means at one end and having clutch teeth on its inner end, a driven member entering the casing through the support means at the other end of the casing and having clutch teeth on its inner end, transmission means located within the hollow portion of the casing and comprising a splined shaft slidably carrying a member thereon, with means for securing this member in a desired longitudinal position on the shaft, this member having clutch teeth at one end in mesh with the teeth on the end of the driving member, a gear type clutch fixedly carried by the casing on its interior portion adjacent the inner end of the driven member, clutch teeth on the end of the splined shaft and adapted in one position of operation to mesh with the gear type clutch carried by the casing and also with the clutch teeth on the driven member in another position of operation, and means for shifting the said transmission longitudinally within the casing to shift the power coming from the driving member from the casing to the driven member and vice versa.

2. A power take-off structure as set forth in claim 1, further defined in that the means for shifting said transmission means comprises, a pair of rings fastened one at each end of the casing, a pair of pins at each end of the casing and extending from the rings at their respective ends inwardly at an angle into close proximity to opposed surfaces on said member carried by the splined shaft.

3. A power take-off structure as set forth in claim 1, further defined in that the said member carried by the splined shaft has an enlargement similar to two truncated cones having their bases together, while the casing has oppositely disposed pairs of pins, each pair adapted to contact with one of said cones for the purposes described, and means on the outer ends of the casing for acting on the pins to cause them to move the transmission means longitudinally within the casing.

4. A power take-off structure as set forth in claim 1, further defined in that the said member carried by the splined shaft has an enlargement similar to two truncated cones having their bases together, this enlargement carrying said means for securing said member longitudinally onto the said shaft, a pair of flanged rings carried one at each end of the casing and a pair of arcuately spaced pins extending from the flange of each ring at an angle through the casing into close proximity to the cone surfaces, and means for applying force to said rings as desired to cause them to shift the said transmission means for the purpose described.

5. A power take-off structure as set forth in claim 1, further defined in that the casing is made in a plurality of separable parts, preferably two in number, a pin extending through opposite ends of each part, the pins being spaced 180 degrees from each other when the casing parts are in assembled position, said pins acting as part of said shifting means, and engagement means near the extremities of the casing for acting on the pins.

6. A power take-off structure including a cylindrical casing rotatably mounted at opposite ends on support means, the casing being adapted to receive power-transmitting means thereon, a driving member entering the casing at one end, a driven member entering the casing at the opposite end and both members terminating within the casing, transmission means positioned wholly within and longitudinally movable within the casing, with means carried by the casing, the transmission means and said members, for completing a drive to the casing or to the driven member, as desired, and means carried by the casing for acting on the transmission means to shift it so as to cause rotation of the casing or the driven member when the power-transmitting means are operated.

7. A power take-off structure as set forth in claim 6, further defined in that said transmission means includes a shaft carrying a member non-rotatably but slidably adjustable thereon, one end of this member terminating in a gear type clutch meshing with a gear type clutch on the driving member, while the shaft carries a gear type clutch adapted to mesh with a gear type clutch carried by the casing or a gear type clutch carried by the driven member.

8. A power take-off structure as set forth in claim 6, further defined in that said means for shifting the transmission means within the casing comprises a plurality of arcuately positioned pins extending inwardly at an acute angle to the axis of the structure from opposite ends of the casing into close proximity to opposed parts of the transmission means to move it in opposite directions, and means for transmitting force to said pins.

9. A power take-off structure as set forth in claim 6, further defined in that said means, carried by the casing, the transmission means and said members, for completing a drive to the casing or to the driven member, includes a gear type clutch on the driving member in continuous mesh with a gear type clutch on the transmission means which has a gear type clutch at its opposite ends for meshing with a gear type clutch carried on the interior of the casing, or with a gear type clutch carried on the inner end of the driven member.

10. For use with an army repair truck, a power take-off structure interposed between the truck transmission and its differential, said take-off structure including, a casing revolvably mounted and carrying clutch means, a driving member entering the casing from the truck transmission end and having clutch means at its inner end and a driven member leading out of the casing toward the truck differential for connection thereto and having clutch means at its inner end, a longitudinally movable transmission means located wholly within the casing between the driving and driven members and having clutch means at its opposite ends for engagement with the clutch means on the driving and driven members or the clutch means on the casing, and means carried by the casing for shifting said transmission clutch means into engagement with either the casing clutch means or with the driven member clutch means while maintaining driving engagement with the driving member clutch means.

KIBBEY WHITMAN COUSE.